United States Patent [19]

Bouhours

[11] Patent Number: 5,123,635
[45] Date of Patent: Jun. 23, 1992

[54] HYDRAULIC ANTIVIBRATORY DEVICES

[75] Inventor: Jean-Paul Bouhours, Arrou, France

[73] Assignee: Hutchinson, France

[21] Appl. No.: 690,363

[22] Filed: Apr. 24, 1991

[30] Foreign Application Priority Data

May 17, 1990 [FR] France ................ 90 06174

[51] Int. Cl.⁵ ................................. F16M 1/00
[52] U.S. Cl. .................. 267/140.1 AE; 267/140.1 R; 248/562
[58] Field of Search .............. 267/140.1 C, 140.1 R, 267/140 AE, 141.2, 141.6, 219, 35, 140.1 A; 248/550, 562, 636, 638, 566; 180/300, 312, 902

[56]           References Cited
          U.S. PATENT DOCUMENTS 4,724,936  2/1988  Koga et al. ............ 267/140.1 C
4,763,884  8/1988  Matsui et al. .......... 267/140.1 C
4,822,010  4/1989  Thom .................. 267/140.1 C Primary Examiner—Robert J. Oberleitner
Assistant Examiner—Chris Schwartz
Attorney, Agent, or Firm—Larson and Taylor

[57] ABSTRACT

A hydraulic antivibratory device is disclosed in which the restricted passage joining together the two chambers (A, B) comprises three portions (4, 5, 6) mounted in parallel, namely a first portion (4) whose flow section remains constant and two other portions (5, 6) whose flow sections are adjustable successively from a zero value to a maximum value by two rotary cams (9, 10) mounted on the same shift (11): the device thus provides good damping for oscillations whose frequencies increase (for example from 5 to 20 Hz) when the shaft is rotating.

6 Claims, 1 Drawing Sheet

HYDRAULIC ANTIVIBRATORY DEVICES

The invention relates to hydraulic antivibratory devices inserted for damping, connection and even support purposes between two rigid elements such as a vehicle chassis and a suspension train or the engine of this vehicle.

It relates more particularly among these devices to those which comprise :
two rigid frames able to be secured respectively to the two rigid elements to be joined together,
an elastomer body working in a direction X, which body connects together the two frames and forms at least partially therewith two sealed chambers aligned in direction X,
a restricted passage causing the two chambers to communicate with each other,
and a liquid mass filling the two chambers and the restricted passage.

With such a device, the application on one of the frames, in direction X, of relatively high amplitude oscillations (generally greater than 0.5 mm) and of relatively low frequency (generally about 5 to 15 Hz) such as those caused by the resonance of suspended elements, results in driving the liquid from one of the two chambers into the other and conversely through the restricted passage, with the, liquid mass thus driven being caused to resonate when the frequency of said oscillations reaches a pre-determined value depending on the ratio between the axial length and the cross section of the restricted passage, such resonance providing excellent damping of the oscillations concerned.

The invention relates more particularly still, among the antivibratory devices of the above described kind, to those in which the restricted passage is split up into two portions mounted in parallel between the two chambers, the flow section of one of these portions or first portion being invariable and that of the second portion being on the contrary adjustable between a minimum, preferably zero, value and a maximum value, the dimensions of the first portion being determined so that, when the flow section of the second portion is minimum, the device provides optimum damping for a relatively low frequency $F_1$, for example about 5 Hz, and the dimensions of the second portion being determined so that, when its flow section is maximum, the device provides optimum damping for a relatively high frequency $F_2$, for example of about 30 to 40 Hz.

The antivibratory devices of the above kind give satisfactory results for frequencies $F_1$, $F_2$ corresponding respectively to the minimum and maximum flow sections of the second portion.

But for the intermediate values of this flow section, for which the frequency of the optimally damped oscillations is between the two values $F_1$ and $F_2$, experience shows that damping may become very low, even insufficient for certain applications.

The object of the invention is especially to overcome this drawback.

For this, the antivibratory devices of the kind in question according to the invention further comprise, for forming the restricted passage, two parallel portions responding to the above definitions and they are essentially characterized in that they further comprise a third portion mounted in parallel with the first two and whose flow section is adjustable like that of the second portion, the dimensions of the three portions being chosen so that the device provides optimum damping at frequency $F_1$ for maximum closure of the second and third portions, at frequency $F_2$ for the maximum opening of the second and third portions and at a frequency $F_3$ situated in the range separating the frequencies $F_1$ and $F_2$ for maximum opening of the third portion and maximum closure of the second portion, in that the adjustment of the flow sections of the second and third portions are provided by rotary cams fast with the same shaft and in that the angular positions of this shaft are made dependent on the frequencies of the oscillations to be damped.

In preferred embodiments recourse is further had to one and/or other of the following arrangements :
the profiles of the cams are designed so that, from an angular position in which they completely close the second and third portions, the rotation of the shaft with which they are fast results successively in progressively freeing the third portion as far as maximum opening thereof, then the second portion as far as maximum opening thereof,
two at least of the three portions have a common part opening into one of the chambers through the same orifice.

Apart from these main arrangements, the invention comprises certain other arrangements which are preferably used at the same time and which will be more explicitly discussed hereafter.

In what follows, a preferred embodiment of the invention will be described with reference to the accompanying drawings in a way which is of course in no way limitative.

FIGS. 1 and 2 of these drawings show respectively, in axial section through I—I of FIG. 2 and in cross section through II—II of FIG. 1, a hydraulic antivibratory device constructed in accordance with the invention;

Figure 1:
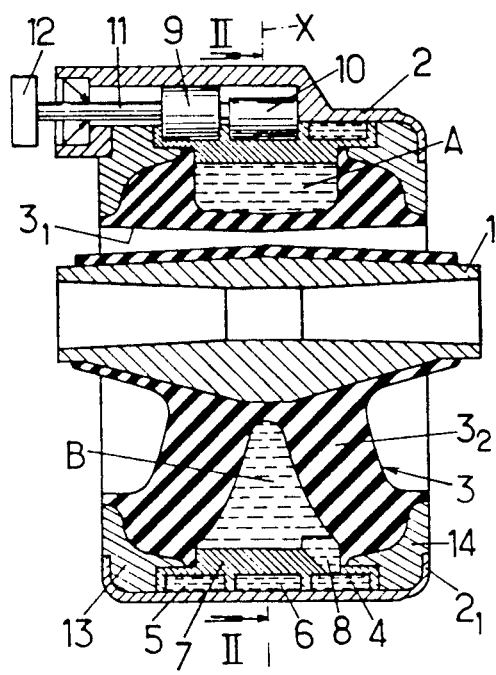

The antivibratory device more particularly illustrated is here a support sleeve of the diametral deflection type.

This sleeve comprises :
an internal tubular metal frame 1,
an external tubular metal frame of revolution 2 surrounding frame 1; and
an elastomer body 3 connecting the two frames 1 and 2 together while forming therebetween two sealed chambers A and B diametrally opposite in a direction X.

The internal frame 1 is intended to be fastened to a pin (not shown) which passes jointingly therethrough whereas the external frame 2 is intended to be fixed to a bearing (not shown), this pin and this bearing being fast respectively with two rigid elements between which it is desired to mount the antivibratory device, which elements will be assumed hereafter to be a vehicle chassis and the internal combustion engine of this vehicle.

The two chambers A and B communicate together through narrow channels which will be described below and the assembly formed by these two chambers and these narrow channels is filled with a liquid L.

Figure 2:
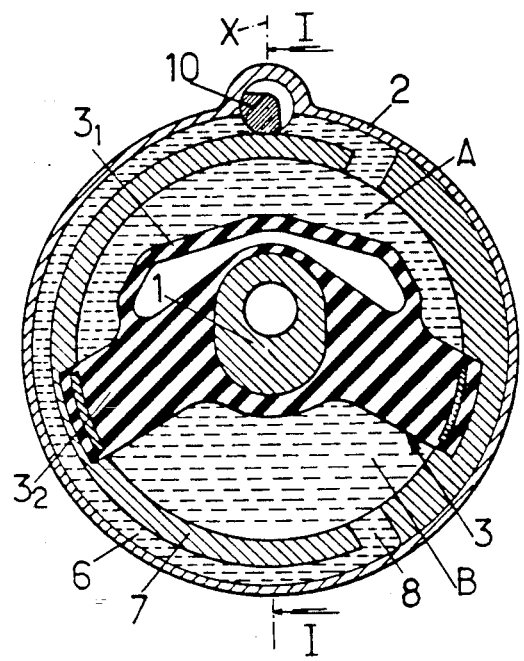
Figure 3:
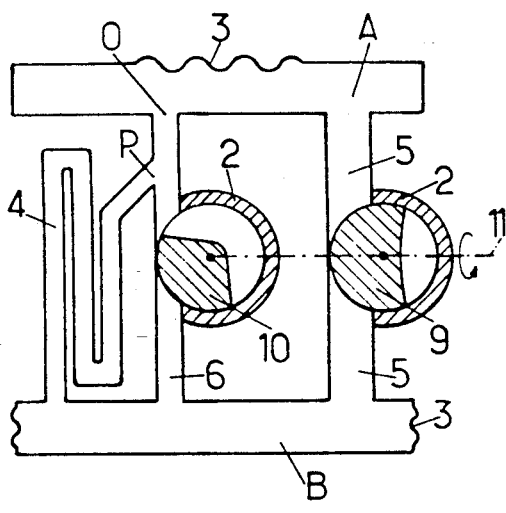
FIG. 3 is a diagram showing the hydraulic circuits of this device as well as the method of adjusting them.

The narrow channels in question are three in number, designated respectively by the references 4, 5 and 6 in FIGS. 1, 2 and 3.

All three are defined outwardly by the inner face of the external tubular frame 1 and inwardly by grooves formed in a cylindrical sleeve 7 itself introduced jointingly into said frame 2, communication between each channel and chambers A and B being through apertures or orifices 8 formed in sleeve 7.

The first channel 4 is permanently open and its cross section remains invariable.

The flow sections of the second channel and of the third channel 6 are on the contrary adjustable by means of rotary cams 9 and 10 both fast with the same shaft 11 mounted on frame 2 and having an axis parallel to that of this frame.

Each of cams 9 and 10 is mounted so as to be able to completely close, or partially or totally free the channel 5 or 6 with which it is associated, depending on its angular position.

The designs and respective angular positions of these cams 9 and 10 are chosen so that they close completely, and at the same time, the two channels 5 and 6 for a given angular position of shaft 11 and so that, by rotating this shaft from this position, partial and then complete freeing of channel 6 is obtained, then partial, then complete freeing of channel 5.

The angular movements of shaft 11 are controlled by an assembly 12 which is driven by the frequency of the oscillations to be damped.

This assembly is arranged so as to detect said frequency at all times and correct the angular position of shaft 11 so that the degrees of opening of the two channels 5 and 6 at said time are precisely those corresponding to optimum damping of the oscillations occurring at the detected frequency.

The assembly in question comprises for example a revolution counter for detecting the speed of rotation of the drive shaft of the vehicle if the oscillations which it is desired to damp are those generated by the operation of this engine.

The three channel device which has just been described may be used advantageously for damping oscillations applied in direction X between the two frames 1 and 2 and whose frequencies are between a minimum value $F_1$ of about 5 Hz and a maximum $F_2$ of 30 to 40 Hz.

For this, the first channel 4 is dimensioned so that, when it alone connects the two chambers A and B together, with the other two channels closed by their respective cams, the optimally damped oscillations have a frequency equal to $F_1$.

The dimensions of the third channel 6 are chosen so that, when this third channel is completely open and when the second channel 5 remains closed, the optimally damped oscillations are those corresponding to a frequency $F_3$ between the two frequencies $F_1$ and $F_2$, for example about 15 Hz for the numerical example chosen above.

Finally, the dimensions of the second channel 5 are chosen so that, when the three channels 4, 5 and 6 are completely freed, the optimally damped oscillations are those corresponding to the maximum frequency $F_2$.

With such a device, the different oscillations corresponding to the frequencies $F_1$, $F_2$ and $F_3$ can be excellently damped and the same can be said practically for all the frequencies between these three values.

Figure 4:
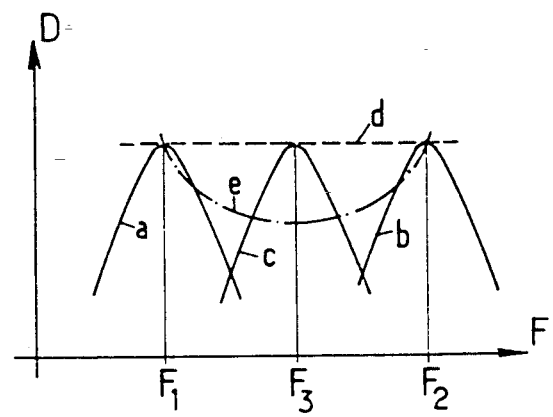
FIG. 4 is an explanatory graph.

This result is shown schematically in FIG. 4 where a graph can be seen showing, as a function of the frequency F plotted in abscissae, the degree of damping D plotted as ordinates.

The three curves a, b and c correspond respectively to the behaviour of the device with respect to the different frequencies, for a) complete opening of channel 4 alone with complete closure of channels 5 and 6,
b) complete opening of the three channels 4, 5 and 6,
c) complete opening of channels 4 and 6 with complete closure of channel 5.

It can be seen that these three curves corresponding respectively to three distinct angular positions of shaft 11 have respectively peaks for the three frequencies $F_1$, $F_2$ and $F_3$ and that, for frequency values other than those, damping of the device is limited.

The curve shown at d corresponds to operation of the above device automatically controlled by the frequencies of the oscillations to be damped as described above : it can be seen that this curve can be likened in a first approximation to a horizontal straight line, which shows the excellence of the damping obtained for all the frequencies between $F_1$ and $F_2$.

By comparison, at e can be seen the curve representing the behaviour of the same device in the absence of the third channel which forms the main characteristic of the present invention : this curve e of course joins up with curve d for frequencies $F_1$ and $F_2$, but shows an appreciable drop in damping for the intermediate frequencies.

As was mentioned above, the dimensions of the different channels 4, 5 and 6 are determined as a function of pre-determined frequency values.

Their respective cross sections and/or angular extents are generally distinct.

In particular, one at least of these channels, generally the first channel 4, may extend along several circumferences of sleeve 7, being formed for example by several successive helical turns or several circular portions connected end to end by oblique portions.

In advantageous embodiments, the depths of the grooves formed in sleeve 7 for forming the channels are identical with each other and it is their widths which are different from each other, while being constant along the whole length of each channel.

To reduce the number of apertures 8 and possibly gain space, one at least of these apertures, such as that designated by the reference O in FIG. 3, may be placed in common for at least two channels and so the latter may be joined together (at a point P, FIG. 3) at a certain distance from the aperture considered, which forms a channel portion (OP) common to these channels.

In the drawings, we can further see :
that, in a way known per se, the two chambers A and B formed between frame 2 and elastomer body 3 — which encases frame 1 — are respectively of a compensation chamber type, defined partially by a very deformable bellows $3_1$ and a work chamber, partially defined by wall $3_2$ able to transfer loads between the two frames 1 and 2 in direction X and working resiliently in compression and flexion,
and that body 3 is adhered to two rigid rings 13, 14 inserted axially and jointingly between the axial ends of sleeve 7 and the inwardly bent edges $2_1$ of the external tubular frame 2.

Following which and whatever the embodiment adopted, a hydraulic antivibratory device is finally obtained whose construction, operation and advantages are sufficiently clear from the foregoing.

As is evident, and as follows moreover from the above discussed, the invention is in no way limited to those of its modes of application and embodiments which have been more especially considered; it embraces, on the contrary, all variants thereof, particularly:

those in which the hydraulic antivibratory device is of the axial and not diametral deflection type, the two rigid frames then being a stud and a ring, with axis X, joined together by a resilient truncated cone shaped wall with axis X, the ring carrying a sealed deformable bellows and an intermediate dividing wall which divides, in the two above chambers A and B, the inside of the case formed by the frames, the wall and the bellows and the restricted passage joining the two chambers A and B together as before.

those where the number of portions forming the restricted passage is greater than three, the openings of the different portions other than the first one being further adjustable successively by means of rotary cams fast with the same shaft so that, for one of the endmost angular positions of the shaft, the whole of these other portions are closed and that, on the contrary, for the other endmost angular position of said shaft, the whole of said other portions are open.

I claim:

1. A hydraulic antivibratory device for insertion between two rigid elements, comprising two rigid frames securable, respectively, to the two rigid elements to be joined together, an elastomer body joining the two frames together and forming at least partially therewith two sealed chambers aligned in a direction X, a restrictive passage causing the two chambers to communicate with each other, and a liquid mass filling the two chambers and the restricted passage, said restricted passage being formed of at least three portions mounted in parallel between the two chambers, the flow section of a first of these portions being invariable and the flow section of a second of these portions being adjustable between a minimum value and a maximum value, the dimensions of the flow section of the first portion being determined so that, when the flow section of the second portion is at its minimum, the device provides optimum damping for a relatively low frequency $F_1$, and the dimensions of the flow section of the second portion being determined so that, when the flow section of the second portion is at its maximum, the device provides optimum damping for a relatively high frequency $F_2$, a third portion of the restricted passage mounted in parallel with the first two portions, the flow section of the third portion being adjustable, the dimensions of the flow sections of the three portions being such that the device provides optimum damping at frequency $F_1$ for maximum closure of the flow section of the second and third portions, provides optimum damping at frequency $F_2$ for the maximum opening of the second and third portions and provides optimum damping at a frequency $F_3$ which has a value between the frequencies $F_1$ and $F_2$ for maximum opening of the third portion and maximum closure of the second portion, valve means for adjusting the flow section of each of the second and third portions, both said valve means being operationally integral for movement together, and adjustment means for adjusting said valve means in dependance on the frequencies of the oscillations to be damped.

2. A hydraulic antivibratory device according to claim 1, including a shaft, each of said valve means comprising a cam, both cams being fast with said shaft, and the angular position of the shaft being dependent on the frequencies of the oscillations to be damped.

3. A hydraulic antivibratory device according to claim 2, wherein the profiles of the cams are designed so that, from an angular position in which they completely close the second and third portions, the rotation of the shaft with which they are fast results, successively, in progressively opening the third portion to its maximum opening, then opening the second portion to its maximum opening.

4. A hydraulic antivibratory device according to claim 2, wherein the frequencies $F_1$ and $F_2$ are respectively approximately 5 Hz and in the range between 30 to 40 Hz.

5. A hydraulic antivibratory device according to claim 2, wherein at least two of the three portions open into one of the chambers through a common orifice.

6. A hydraulic antivibratory device according to claim 2, wherein the number of portions forming the restricted passage is greater than three, each of the portions other than the said first three portions including a rotary cam fast with the said shaft for adjusting the opening of its respective flow section.

* * * * *